United States Patent
Yu et al.

(10) Patent No.: US 10,954,410 B2
(45) Date of Patent: Mar. 23, 2021

(54) MOISTURE CURABLE COMPOSITION FOR WIRE AND CABLE INSULATION AND JACKET LAYERS

(71) Applicants: Dow Global Technologies LLC, Midland, MI (US); Rohm and Haas Company, Collegeville, PA (US); Dow Silicones Corporation, Midland, MI (US)

(72) Inventors: Xindi Yu, Collegeville, PA (US); Yichi Zhang, Collegeville, PA (US); Bharat I. Chaudhary, Collegeville, PA (US); Gerald Lawrence Witucki, Midland, MI (US)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/634,739

(22) PCT Filed: Jul. 31, 2018

(86) PCT No.: PCT/US2018/044510
§ 371 (c)(1),
(2) Date: Jan. 28, 2020

(87) PCT Pub. No.: WO2019/027961
PCT Pub. Date: Feb. 7, 2019

(65) Prior Publication Data
US 2020/0199397 A1   Jun. 25, 2020

Related U.S. Application Data

(60) Provisional application No. 62/538,977, filed on Jul. 31, 2017.

(51) Int. Cl.
| | | |
|---|---|---|
| H01B 3/00 | (2006.01) | |
| C09D 151/06 | (2006.01) | |
| C08F 255/02 | (2006.01) | |
| H01B 3/44 | (2006.01) | |
| H01B 3/46 | (2006.01) | |
| H01B 7/02 | (2006.01) | |
| H01B 13/14 | (2006.01) | |
| B29C 48/06 | (2019.01) | |
| B29K 96/02 | (2006.01) | |
| B29L 31/34 | (2006.01) | |
| C08K 3/36 | (2006.01) | |
| C08K 5/134 | (2006.01) | |
| C08K 5/25 | (2006.01) | |
| C08K 5/5419 | (2006.01) | |
| C08K 3/22 | (2006.01) | |
| C08K 3/26 | (2006.01) | |

(52) U.S. Cl.
CPC .......... *C09D 151/06* (2013.01); *C08F 255/02* (2013.01); *H01B 3/441* (2013.01); *H01B 3/46* (2013.01); *H01B 7/0275* (2013.01); *H01B 13/148* (2013.01); *B29C 48/06* (2019.02); *B29K 2023/06* (2013.01); *B29K 2096/02* (2013.01); *B29L 2031/3462* (2013.01); *C08K 3/36* (2013.01); *C08K 5/134* (2013.01); *C08K 5/25* (2013.01); *C08K 5/5419* (2013.01); *C08K 2003/2241* (2013.01); *C08K 2003/265* (2013.01)

(58) Field of Classification Search
CPC ....................................................... H01B 3/00
USPC ...................................... 174/110 R, 110 SR
See application file for complete search history.

(56) References Cited

U.S. PATENT DOCUMENTS

| | | |
|---|---|---|
| 3,225,018 A | 12/1965 | Zutty |
| 4,255,303 A | 3/1981 | Keogh |
| 4,500,648 A | 2/1985 | Malpass |
| 4,574,133 A | 3/1986 | Umpleby |
| 4,985,067 A | 1/1991 | Stadlbauer et al. |
| 5,034,442 A | 7/1991 | Hirose et al. |
| 5,741,858 A | 4/1998 | Brann et al. |
| 5,986,028 A | 11/1999 | Lai et al. |
| 6,936,655 B2 | 8/2005 | Borke et al. |
| 7,514,489 B2 | 4/2009 | Granada et al. |
| 2008/0251273 A1 | 10/2008 | Brown et al. |
| 2012/0178867 A1 | 7/2012 | Esseghir et al. |
| 2012/0178868 A1 | 7/2012 | Esseghir et al. |
| 2014/0193628 A1 | 7/2014 | Esseghir et al. |
| 2015/0004343 A1 | 1/2015 | Levchick et al. |
| 2015/0028518 A1 | 1/2015 | Esseghir et al. |
| 2015/0200038 A1 | 7/2015 | Esseghir et al. |
| 2016/0264736 A1* | 9/2016 | Johnston, Jr. ............ C08L 83/04 |
| 2018/0127555 A1 | 5/2018 | Chaudhary et al. |

* cited by examiner

*Primary Examiner* — Chau N Nguyen
(74) *Attorney, Agent, or Firm* — Quarles & Brady LLP

(57) ABSTRACT

An insulation or jacket layer for a coated conductor is composed of (A) a crosslinked silane-functionalized polyolefin, (B) a filler, (C) a reactive branched polysiloxane, and (D) from 0.00 wt % to 20 wt % of a silanol condensation catalyst.

15 Claims, No Drawings

MOISTURE CURABLE COMPOSITION FOR WIRE AND CABLE INSULATION AND JACKET LAYERS

FIELD OF THE DISCLOSURE

This disclosure relates to moisture curable compositions. In one aspect, the disclosure relates to moisture curable compositions with high wet electrical insulation resistance and flame retardancy, while in another aspect, the disclosure relates to insulation and jacket layers for wires and cables comprising a moisture curable composition and coated conductors including the same.

BACKGROUND

Moisture-curable flame retardant compositions containing a silane-functionalized polyolefin (e.g., a silane-grafted polyolefin) are frequently used to form coatings, and particularly insulation or jacket layers, for wires and cables. Many flame retardant compositions including fillers such as metal hydrates and silica that often yield less than desirable burn performance and/or mechanical properties (e.g., crush resistance, tensile elongation, etc.).

To improve properties, a linear silicone fluid can be added to the composition. The addition of a linear silicone fluid improves some properties, including tensile elongation. While such formulations are suitable for certain lower-voltage requirements, these formulations still do not meet standards for crush resistance. Consequently, the art recognizes the need for flame retardant compositions that have improved crush resistance performance in moisture curable cable and wire insulation.

SUMMARY

The disclosure provides crosslinkable composition for an insulation or jacket layer for a coated conductor. In an embodiment, the crosslinkable composition comprises (A) a crosslinked silane-functionalized polyolefin; (B) a filler; (C) a reactive branched polysiloxane; and (D) from 0.00 wt % to 20 wt % of a silanol condensation catalyst, based on the total weight of the crosslinkable composition.

In another embodiment, the disclosure provides an insulation or jacket layer for a coated conductor. In an embodiment, the insulation layer comprises (A) a crosslinked silane-functionalized polyolefin; (B) a filler; (C) a reactive branched polysiloxane; and (D) from 0.00 wt % to 20 wt % of a silanol condensation catalyst, based on the total weight of the insulation or jacket layer.

In another embodiment, the disclosure provides a coated conductor. In an embodiment, the coated conductor comprises a conductor and a coating the conductor, the coating comprising (A) a crosslinked silane-functionalized polyolefin; (B) a filler; (C) a reactive branched polysiloxane; and (D) from 0.00 wt % to 20 wt % of a silanol condensation catalyst, based on the total weight of the coating.

Definitions and Test Methods

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure and all test methods are current as of the filing date of this disclosure.

"Alkyl" and "alkyl group" refer to a saturated linear, cyclic, or branched hydrocarbon group. "Aryl group" refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. In particular embodiments, aryls have between 1 and 200 carbon atoms, between 1 and 50 carbon atoms or between 1 and 20 carbon atoms.

"Alkoxy" refers to the —OZ' radical, where representative $Z^1$ include alkyl, substituted alkyl, cycloalkyl, substituted cycloalkyl, heterocycloalkyl, substituted heterocycloalkyl, silyl groups and combinations thereof. Suitable alkoxy radicals include, for example, methoxy, ethoxy, benzyloxy, t-butoxy, etc. "Aryloxy" where representative Z' include aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, preferably of 3 to 20 carbon atoms, in some cases preferably of 4 to 10 carbon atoms and in other cases preferably of 4 to 8 carbon atoms. Nonlimiting examples of α-olefins from which the elastomers are prepared include ethylene, propylene, 1-butene, 1-pentene, 1-hexene, 1-octene, 1-dodecene, and mixtures of two or more of these monomers.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations. Blends are not laminates, but one or more layers of a laminate may contain a blend.

"Carboxylate" refers to a salt or ester of carboxylic acid.

"Composition," as used herein, includes a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed. The term "or," unless stated otherwise, refers to the listed members individual as well as in any combination. Use of the singular includes use of the plural and vice versa.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will effectuate substantial crosslinking upon subjection or exposure to such treatment (e.g., exposure to water).

"Crosslinked" and similar terms mean that the polymer composition, before or after it is shaped into an article, has xylene or decalin extractables of less than or equal to 90 weight percent (i.e., greater than or equal to 10 weight percent gel content).

Crush resistance is measured according to Section 7.11, UL-2556 (condition: 14 AWG) and reported in Newtons.

"Cured" and like terms means that the polymer, before or after it is shaped into an article, was subjected or exposed to a treatment which induced crosslinking.

Density is measured in accordance with ASTM D792, Method B. The result is recorded in grams (g) per cubic centimeter (g/cc or g/cm$^3$).

Dynamic viscosity is a fluid's resistance to shearing flows and is reported in Pa·s (pascal seconds), mPa·s (millipascal seconds) or MPa·s (megapascal seconds). Shear viscosity is calculated by $\eta=\tau/\dot{\gamma}$ wherein $\eta$ is the shear viscosity measured in Pascal·seconds, $\tau$ is the shear stress measured in Pascal, and $\dot{\gamma}$ is the shear rate, measured in reciprocal seconds. For purposes of this disclosure, the dynamic viscosity is measured in accordance with ASTM D445.

An "ethylene/α-olefin polymer" is a polymer that contains a majority amount of polymerized ethylene, based on the weight of the polymer, and one or more α-olefin comonomers.

An "ethylene-based polymer," "ethylene polymer," or "polyethylene" is a polymer that contains equal to or greater than 50 wt %, or a majority amount of polymerized ethylene based on the weight of the polymer, and, optionally, may comprise one or more comonomers. The comonomers include but are not limited to alpha-olefins and unsaturated esters. Suitable nonlimiting examples of unsaturated esters include alkyl acrylates, alkyl methacrylates, and vinyl carboxylates. Nonlimiting examples of acrylates and methacrylates include ethyl acrylate, methyl acrylate, methyl methacrylate, t-butyl acrylate, n-butyl acrylate, n0butyl methacrylate, and 2 ethylhexyl acrylate. Nonlimiting examples of vinyl carboxylates include vinyl acetate, vinyl propionate and vinyl butanoate. The generic term "ethylene-based polymer" thus includes ethylene homopolymer and ethylene interpolymer. Non-limiting examples of ethylene-based polymer (polyethylene) include low density polyethylene (LDPE) and linear polyethylene. Non-limiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (HDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. Polyethylene may also be produced in a high pressure reactor without a catalyst.

"Functional group" and like terms refer to a moiety or group of atoms responsible for giving a particular compound its characteristic reactions. Non-limiting examples of functional groups include heteroatom-containing moieties, oxygen-containing moieties (e.g., alcohol, aldehyde, ester, ether, ketone, and peroxide groups), and nitrogen-containing moieties (e.g., amide, amine, azo, imide, imine, nitratie, nitrile, and nitrite groups).

Hot deformation is measured according to Section 7.8, UL-2556 (conditions: 131° C. for 30 minutes; 500 g/4.9 N load for 14 AWG) and reported in percent.

"Hydrolysable silane group" and like terms mean a silane group that will react with water. These include alkoxysilane groups on monomers or polymers that can hydrolyze to yield silanol groups, which in turn can condense to crosslink the monomers or polymers.

"Interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Kinematic viscosity is the ratio of the shear viscosity to the density of a fluid and is reported in St (stokes) or cSt (centistokes). For purposes of this specification, kinematic viscosity is measured at 40° C. using a Brookfield viscometer in accordance with ASTM D445.

Median particle size, or D50, is the particle diameter at which 50% of the particles have a diameter less than or equal to D50 and 50% of the particles have a diameter greater than D50.

Melt index (MI) measurement for polyethylene is performed according to ASTM D1238, Condition 190° C./2.16 kilogram (kg) weight, formerly known as "Condition E" and also known as $I_2$, and is reported in grams eluted per 10 minutes.

"Moisture curable" and like terms indicate that the composition will cure, i.e., crosslink, upon exposure to water. Moisture cure can be with or without the assistance of a crosslinking catalyst (e.g., a silanol condensation catalyst), promoter, etc.

"Polyolefin" and liked terms mean a polymer derived from simple olefin monomers, e.g., ethylene, propylene, 1-butene, 1-hexene, 1-octene and the like. The olefin monomers can be substituted or unsubstituted and, if substituted, the substituents can vary widely.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin comonomers. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer," "propylene polymer," or "polypropylene" is a polymer that contains equal to or greater than 50 wt %, or a majority amount of polymerized propylene based on the weight of the polymer, and, optionally, may comprise one or more comonomers. The generic term "propylene-based polymer" thus includes propylene homopolymer and propylene interpolymer.

Room temperature is 25° C.+/−4° C.

A "sheath" is a generic term and when used in relation to cables, it includes insulation coverings or layers, protective jackets and the like.

Specific gravity is the ratio of the density of a substance to the density of a standard. In the case of a liquid, the standard is water. Specific gravity is a dimensionless quantity and is measured in accordance with ASTM D1298.

The weight average molecular weight (Mw) is defined as weight average molecular weight of polymer, and the number average molecular weight (Mn) is defined as number average molecular weight of polymer. The polydispersity index is measured according to the following technique: The polymers are analyzed by gel permeation chromatography (GPC) on a Waters 150° C. high temperature chromatographic unit equipped with three linear mixed bed columns (Polymer Laboratories (10 micron particle size)), operating at a system temperature of 140° C. The solvent is 1,2,4-trichlorobenzene from which about 0.5% by weight solutions of the samples are prepared for injection. The flow rate is 1.0 milliliter/minute (mm/min) and the injection size is 100 microliters (μL). The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968, incorporated herein by reference) to derive the equation:

$$M\text{polyethylene}=(a)(M\text{polystyrene})^b$$

In this equation, a=0.4316 and b=1.0.

Weight average molecular weight, Mw, is calculated in the usual manner according to the formula:

$$Mw=E(w_i)(M_i)$$

in which wi and Mi are the weight fraction and molecular weight respectively of the ith fraction eluting from the GPC column. Generally the Mw of the ethylene polymer ranges from 42,000 to 64,000, preferably 44,000, to 61,000, and more preferably 46,000 to 55,000.

A "wire" is a single strand of conductive metal, e.g., copper or aluminum, or a single strand of optical fiber.

DETAILED DESCRIPTION

In an embodiment, the disclosure provides a crosslinkable composition for use as a jacket layer for a coated conductor. As used herein, "jacket layer" encompasses insulation layer. In an embodiment, the jacket layer is an insulation layer.

In an embodiment, the disclosure provides a crosslinkable composition for an insulation or jacket layer for a coated conductor, the crosslinkable composition comprising (A) a crosslinked silane-functionalized polyolefin, (B) a filler, (C) a branched reactive silicone-containing polymer, and (D) from 0.00 wt % to 20 wt % of a silanol condensation catalyst, based on the total weight of the crosslinkable composition.

In an embodiment, the disclosure provides an insulation layer for a coated conductor comprising (A) a crosslinked silane-functionalized polyolefin, (B) a filler, (C) a branched reactive silicone-containing polymer, and (D) from 0.00 wt % to 20 wt % of a silanol condensation catalyst, based on the total weight of the insulation or jacket layer.

(A) Silane-Functionalized Polyolefin

The crosslinkable composition includes a silane-functionalized polyolefin.

In an embodiment, the silane-functionalized polyolefin contains from 0.1 wt %, or 0.3 wt %, or 0.5 wt %, or 0.8 wt %, or 1.0 wt %, or 1.2 wt %, or 1.5 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane-functionalized polyolefin.

In an embodiment, the silane-functionalized polyolefin has a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.930 g/cc, or 0.940 g/cc, or 0.950 g/cc or 0.960 g/cc, or 0.965 g/cc, as measured by ASTM D-792.

In an embodiment, the silane-functionalized polyolefin is an alpha-olefin/silane copolymer or a silane-grafted polyolefin (Si-g-PO).

An alpha-olefin/silane copolymer is formed by the copolymerization of an alpha-olefin (such as ethylene) and a hydrolysable silane monomer (such as a vinyl silane monomer). In an embodiment, the alpha-olefin/silane copolymer in an ethylene/silane copolymer prepared by the copolymerization of ethylene, a hydrolysable silane monomer and, optionally, an unsaturated ester. The preparation of ethylene/silane copolymers is described, for example, in U.S. Pat. Nos. 3,225,018 and 4,574,133, each incorporated herein by reference.

A silane-grafted polyolefin (Si-g-PO) is formed by grafting a hydrolysable silane monomer (such as a vinyl silane monomer) onto the backbone of a base polyolefin (such as polyethylene). In an embodiment, grafting takes place in the presence of a free-radical generator, such as a peroxide. The hydrolysable silane monomer can be grafted to the backbone of the base polyolefin prior to incorporating or compounding the Si-g-PO into a final article or simultaneously with the extrusion of composition to form a final article. For example, in an embodiment, the Si-g-PO is formed before the Si-g-PO is compounded with (B) filler, (C) silicone-containing polymer, (D) silanol condensation catalyst, and other optional components. In another embodiment, the Si-g-PO is formed by compounding a polyolefin, hydrolysable silane monomer and drafting catalyst/co-agent along with the (B) filler, (C) silicone-containing polymer, (D) silanol condensation catalyst, and other optional components.

The base polyolefin for a Si-g-PO may be an ethylene-based or propylene-based polymer. In an embodiment, the base polyolefin is an ethylene-based polymer, resulting in a silane-grafted ethylene-based polymer (Si-g-PE). Non-limiting examples of suitable ethylene-based polymers include ethylene homopolymers and ethylene interpolymers containing one or more polymerizable comonomers, such as an unsaturated ester and/or an alpha-olefin.

The hydrolysable silane monomer used to make an alpha-olefin/silane copolymer or a Si-g-PO is a silane-containing monomer that will effectively copolymerize with an alpha-olefin (e.g., ethylene) to form an alpha-olefin/silane copolymer (e.g., an ethylene/silane copolymer) or graft to and crosslink an alpha-olefin polymer (e.g., a polyolefin) to form a Si-g-PO. Exemplary hydrolysable silane monomers are those having the following structure:

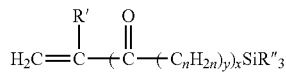

in which R' is a hydrogen atom or methyl group; x and y are 0 or 1 with the proviso that when x is 1, y is 1; n is an integer from 1 to 12 inclusive, preferably 1 to 4, and each R" independently is a hydrolysable organic group such as an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl.

Nonlimiting examples of suitable hydrolysable silane monomers include silanes that have an ethylenically unsaturated hydrocarbyl group, such as vinyl, allyl, isopropenyl, butenyl, cyclohexenyl or gamma-(meth)acryloxy allyl group, and a hydrolysable group, such as, for example, a hydrocarbyloxy, hydrocarbonyloxy, or hydrocarbylamino group. Examples of hydrolysable groups include methoxy, ethoxy, formyloxy, acetoxy, propionyloxy, and alkyl or arylamino groups.

In an embodiment, the hydrolysable silane monomer is an unsaturated alkoxy silane such as vinyl trimethoxy silane (VTMS), vinyl triethoxy silane, vinyl triacetoxy silane, gamma-(meth)acryloxy, propyl trimethoxy silane and mixtures of these silanes.

Nonlimiting examples of suitable unsaturated esters used to make an alpha-olefin/silane copolymer include alkyl acrylate, alkyl methacrylate, or vinyl carboxylate. Nonlimiting examples of suitable alkyl groups include methyl, ethyl, n-propyl, i-propyl, n-butyl, t-butyl, etc. In an embodiment, the alkyl group has from 1, or 2 to 4, or 8 carbon atoms. Nonlimiting examples of suitable alkyl acrylates include ethyl acrylate, methyl acrylate, t-butyl acrylate, n-butyl acrylate, and 2-ethylhexyl acrylate. Nonlimiting examples of suitable alkyl methacrylates include methyl methacrylate and n-butyl methacrylate. In an embodiment, the carboxylate group has from 2 to 5, or 6, or 8 carbon atoms. Nonlimiting examples of suitable vinyl carboxylates include vinyl acetate, vinyl propionate, and vinyl butanoate.

In an embodiment, the silane-functionalized polyolefin is a silane-functionalized polyethylene. A "silane-functionalized polyethylene" is a polymer that contains silane and equal to or greater than 50 wt %, or a majority amount, of polymerized ethylene, based on the total weight of the polymer.

In an embodiment, the silane-functionalized polyethylene contains (i) from 50 wt %, or 55 wt %, or 60 wt %, or 65 wt %, or 70 wt %, or 80 wt %, or 90 wt %, or 95 wt % to 97 wt %, or 98 wt %, or 99 wt %, or less than 100 wt % ethylene and (ii) from 0.1 wt %, or 0.3 wt % or 0.5 wt %, or 0.8 wt %, or 1.0 wt %, or 1.2 wt %, or 1.5 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane-functionalized polyethylene.

In an embodiment, the silane-functionalized polyethylene has a melt index (MI) from 0.1 g/10 min, or 0.5 g/10 min, or 1.0 g/10 min, or 2 g/10 min, or 3 g/10 min, or 5 g/10 min, or 8 g/10 min, or 10 g/10 min, or 15 g/10 min, or 20 g/10 min, or 25 g/10 min, or 30 g/10 min to 40 g/10 min, or 45 g/10 min, or 50 g/10 min, or 55 g/10 min, or 60 g/10 min, or 65 g/10 min, or 70 g/10 min, or 75 g/10 min, or 80 g/10 min, or 85 g/10 min, or 90 g/10 min, measured in accordance with ASTM D1238 (190° C./2.16 kg).

In an embodiment, the silane-functionalized polyethylene is an ethylene/silane copolymer.

In an embodiment, the ethylene/silane copolymer contains ethylene and the hydrolyzable silane monomer as the only monomeric units.

In an embodiment, the ethylene/silane copolymer optionally includes a $C_3$, or $C_4$ to $C_6$, or $C_8$, or $C_{10}$, or $C_{12}$, or $C_{16}$, or $C_{18}$, or $C_{20}$ α-olefin; an unsaturated ester; and combinations thereof. In an embodiment, the ethylene/silane copolymer is an ethylene/unsaturated ester/silane reactor copolymer.

Non-limiting examples of suitable ethylene/silane copolymers include SI-LINK™ DFDA-5451 NT and SI-LINK™ AC DFDB-5451 NT, each available from The Dow Chemical Company, Midland, Mich.

The ethylene/silane reactor copolymer may comprise two or more embodiments disclosed herein.

In an embodiment, the silane-functionalized polyethylene is a Si-g-PE.

The base ethylene-based polymer for the Si-g-PE includes from 50 wt %, or 55 wt %, or 60 wt %, or 65 wt %, or 70 wt %, or 80 wt %, or 90 wt %, or 95 wt % to 97 wt %, or 98 wt %, or 99 wt %, or 100 wt % ethylene, based on the total weight of the base ethylene-based polymer.

In an embodiment, the base ethylene-based polymer for the Si-g-PE has a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.930 g/cc, or 0.940 g/cc, or 0.950 g/cc or 0.960 g/cc, or 0.965 g/cc, as measured by ASTM D-792.

In an embodiment, the base ethylene-based polymer for the Si-g-PE has a melt index (MI) from 0.1 g/10 min, or 0.5 g/10 min, or 1.0 g/10 min, or 2 g/10 min, or 3 g/10 min, or 5 g/10 min, or 8 g/10 min, or 10 g/10 min, or 15 g/10 min, or 20 g/10 min, or 25 g/10 min, or 30 g/10 min to 40 g/10 min, or 45 g/10 min, or 50 g/10 min, or 55 g/10 min, or 60 g/10 min, or 65 g/10 min, or 70 g/10 min, or 75 g/10 min, or 80 g/10 min, or 85 g/10 min, or 90 g/10 min, measured in accordance with ASTM D1238 (190° C./2.16 kg).

In an embodiment, the base ethylene-based polymer for the Si-g-PE is a homogeneous polymer. Homogeneous ethylene-based polymers have a polydispersity index (Mw/Mn or MWD) in the range of 1.5 to 3.5 and an essentially uniform comonomer distribution, and are characterized by a single and relatively low melting point as measured by a differential scanning calorimetry (DSC). Substantially linear ethylene copolymers (SLEP) are homogeneous ethylene-based polymers.

As here used, "substantially linear" means that the bulk polymer is substituted, on average, with from about 0.01 long-chain branches/1000 total carbons (including both backbone and branch carbons), or about 0.05 long-chain branches/1000 total carbons (including both backbone and branch carbons), or about 0.3 long-chain branches/1000 total carbons (including both backbone and branch carbons) to about 1 long-chain branch/1000 total carbons (including both backbone and branch carbons), or about 3 long-chain branches/1000 total carbons (including both backbone and branch carbons).

"Long-chain branches" or "long-chain branching" (LCB) means a chain length of at least one (1) carbon less than the number of carbons in the comonomer. For example, an ethylene/1-octene SLEP has backbones with long chain branches of at least seven (7) carbons in length and an ethylene/1-hexene SLEP has long chain branches of at least five (5) carbons in length. LCB can be identified by using 13 C nuclear magnetic resonance (NMR) spectroscopy and to a limited extent, e.g. for ethylene homopolymers, it can be quantified using the method of Randall (Rev. Macromol. Chem. Phys., C29 (2&3). p. 285-29'7). U.S. Pat. No. 4,500,648 teaches that LCB frequency can be represented by the equation LCB=b/Mw in which b is the weight average number of LCB per molecule and Mw is the weight average molecular weight. The molecular weight averages and the LCB characteristics are determined by gel permeation chromatography (GPC) and intrinsic viscosity methods.

SLEPs and their method of preparation are more fully described in U.S. Pat. Nos. 5,741,858 and 5,986,028.

In an embodiment, the base ethylene-based polymer for the Si-g-PE is an ethylene/unsaturated ester copolymer. The unsaturated ester may be any unsaturated ester disclosed herein, such as ethyl acrylate. In an embodiment, the base ethylene-based polymer for the Si-g-PE is an ethylene/ethyl acrylate (EEA) copolymer.

In an embodiment, the base ethylene-based polymer for the Si-g-PE is an ethylene/α-olefin copolymer. The α-olefin contains from 3, or 4 to 6, or 8, or 10, or 12, or 16, or 18, or 20 carbon atoms. Non-limiting examples of suitable α-olefin include propylene, butene, hexene, and octene. In an embodiment, the ethylene-based copolymer is an ethylene/octene copolymer. When the ethylene-based copolymer is an ethylene/α-olefin copolymer, the Si-g-PO is a silane-grafted ethylene/α-olefin copolymer.

Non-limiting examples of suitable ethylene/alpha-olefin copolymers useful as the base ethylene-based polymer for the Si-g-PE include the ENGAGE™ and INFUSE™ resins available from the Dow Chemical Company.

In an embodiment, the silane-functionalized polyolefin is a silane-grafted ethylene/$C_4$-$C_8$ alpha-olefin polymer having one or both of the following properties:
(i) a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.925 g/cc, or 0.930 g/cc, or 0.935 g/cc; and (ii) a melt index from 0.1 g/10 min, or 0.5 g/10 min, or 1.0 g/10 min, or 2 g/10 min, or 5 g/10 min, or 8 g/10 min, or 10 g/10 min, or 15 g/10 min, or 20 g/10 min, or 25 g/10 min, or 30 g/10 min to 30 g/10 min, or 35 g/10 min, or 45 g/10 min, or 50 g/10 min, or 55 g/10 min, or 60 g/10 min, or 65 g/10 min, or 70 g/10 min, or 75 g/10 min, or 80 g/10 min, or 85 g/10 min, or 90 g/10 min.

In an embodiment, the silane-grafted ethylene-based polymer has both of properties (i)-(ii).

The silane-functionalized polyolefin is present in an amount from 10 wt %, or 20 wt %, or 30 wt %, or 40 wt %, or 50 wt % to 60 wt %, or 80 wt %, or 90 wt %, or 95 wt %, based on the total weight of the crosslinkable composition.

Blends of silane-functionalized polyolefins may also be used and the silane-functionalized polyolefin(s) may be diluted with one or more other polymers to the extent that the polymers are (i) miscible or compatible with one another, and (ii) the silane-functionalized polyolefin(s) constitutes from 70 wt %, or 75 wt %, or 80 wt %, or 85 wt %, or 90 wt %, or 95 wt %, or 98 wt %, or 99 wt % to less than 100 wt % of the blend.

The silane-functionalized polyolefin may comprise two or more embodiments disclosed herein.

(B) Filler

The crosslinkable composition optionally includes a filler.

Nonlimiting examples of suitable fillers include halogen free flame retardants (including inorganic materials), halogenated flame retardants, and combinations thereof.

In an embodiment, the crosslinkable composition includes one or more halogenated organic flame retardant fillers having at least one halogen atom, such as bromine or chlorine, bonded to an aromatic or cycloaliphatic ring which can be monocyclic, bicyclic or multicyclic. The halogenated organic flame retardant may include other functional groups which do not adversely affect eth processing or physical characteristics of the crosslinkable composition.

Nonlimiting examples of suitable halogenated organic flame retardants include perchloropentacyclodecane; Diels-Alder adducts of hexachlorocyclopentadiene with "enes" such as maleic anhydride; hexabromobenzene; pentabromoethylbenzene 2,4,6 tribromophenol; tribromopenyl allyl ether; octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylene-bis(tetrabromophthatmide); hexabromocyclododecane; and combinations thereof. Other halogenated organic flame retardants are described in U.S. Pat. No. 6,936,655.

To minimize the amount of the flame retardant compound used, halogenated compounds with high halogen contents, and particularly brominated aromatic compounds having bromine contents greater than 65 wt %, or greater than 70 wt %, or greater than 75 wt %, based on the total weight of the compound, are used. In an embodiment, the high halogen content halogenated flame retardant compound is decabromodiphenyl ether or ethane-1,2-bis(pentabromophenyl).

In an embodiment, the halogenated organic flame retardant is present in an amount of from 0 wt %, or 3 wt %, or 5 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, based on the total weight of the crosslinkable composition.

In an embodiment, the crosslinkable composition includes one or more halogen-free flame retardant (HFFR) fillers to inhibit, suppress, or delay the production of flames. In an embodiment, the HFFR is an inorganic flame retardant.

Nonlimiting examples of suitable HFFRs include metal hydroxides, red phosphorus, silica, alumina, titanium oxide, tin oxide, zinc oxide, carbon nanotubes, talc, clay, organo-modified clay, calcined clay, calcium carbonate, zinc borate, zinc molybdate, zinc sulfide, aluminum trioxide, aluminum trihydroxide antimony trioxide, antimony pentoxide, antimony silicates, wollastonite, mica, boron compounds, ammonium octamolybdate, frits, hollow glass microspheres, intumescent compounds, expanded graphite, carbon black, and combinations thereof. In an embodiment, the halogen-free flame retardant is selected from aluminum hydroxide, magnesium hydroxide, calcium carbonate, and combinations thereof.

The HFFR filler is optionally surface treated (e.g., coated) with a saturated or unsaturated carboxylic acid having from 8, or 12 to 18 or 24 carbons (e.g., stearic acid), or a metal salt thereof; silanes; titanates; phosphates; and zirconates. Exemplary surface treatments are described in U.S. Pat. Nos. 4,255,303; 5,034,442; 7,514,489; US Publication No. 2008/0251273; and WO 2013/116283.

Commercially available examples of HFFR fillers suitable for use in the crosslinkable composition include, but are not limited to, APYRAL™ 40CD available from Nabaltec AG, MAGNIFIN™ H5 available from Magnifin Magnesia-produkte GmbH & Co KG, and combinations thereof.

In an embodiment, the HFFR filler is present in an amount from 0 wt %, or 1 wt %, or 2 wt %, or 5 wt %, or 10 wt %, or 15 wt %, or 20 wt %, or 30 wt %, or 40 wt % to 50 wt %, or 60 wt %, or 70 wt %, or 80 wt %, or 90 wt %, based on the total weight of the crosslinkable composition.

In an embodiment, one or more inorganic HFFR fillers are used in combination with one or more halogenated flame retardant fillers. Flame retardance is increased when inorganic HFFR fillers are used in combination with halogenated flame retardant fillers, and the total amount of halogenated flame retardant filler may be decreased when used in combination with an inorganic HFFR filler.

In an embodiment, the weight ratio of halogenated flame retardant filler to inorganic HFFR filler is from 0.5:1, or 0.7:1, or 1:1 to 2:1, or 3:1, or 4:1, or 5:1.

In an embodiment, the crosslinkable composition includes at least one inorganic antimony flame retardant. In an embodiment, the at least one inorganic antimony flame retardant is selected from antimony trioxide, antimony pentoxide, antimony silicate, and combinations thereof. In an embodiment, the inorganic antimony flame retardant is antimony trioxide.

In an embodiment, the crosslinkable composition includes at least one inorganic antimony flame retardant in combination with at least one zinc compound. In an embodiment, the at least one antimony flame retardant is selected from antimony trioxide, antimony pentoxide, antimony silicate, and combinations thereof, and the at least one zinc compound is selected from zinc oxide, zinc borate, zinc molybdate, zinc sulfide, and combinations thereof. In an embodiment, the at least one inorganic antimony flame retardant is present in an amount from 3 wt %, or 5 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, based on the total weight of the crosslinkable composition, and the zinc compound is present in an amount from 0 wt %, or greater than 0 wt %, or 1 wt %, or 2 wt %, or 3 wt %, or 5 wt % to 7 wt %, or 8 wt %, or 10 wt %, or 12 wt %, or 15 wt %, based on the total weight of the crosslinkable composition.

In an embodiment, the crosslinkable composition includes at least one inorganic antimony flame retardant to the exclusion of zinc oxide, zinc borate, zinc molybdate, and zinc sulfide.

In an embodiment, the crosslinkable composition includes at least one inorganic antimony flame retardant to the exclusion of all other inorganic HFFR fillers.

In an embodiment, the filler has a median particle size (D50) of from 0.01 μm, or 0.1 μm, or 0.5 μm, or 1.0 μm, or 5.0 μm, or 10.0 μm to 20.0 μm, or 25.0 μm, or 30.0 μm, or 35.0 μm, or 40.0 μm, or 45.0 μm, or 50.0 μm.

In an embodiment, the filler is a blend of two or more fillers as disclosed herein.

In an embodiment, the filler is present in an amount from 0 wt %, or greater than 0 wt %, or 10 wt %, or 20 wt %, or 40 wt % to 50 wt %, or 60 wt %, or 70 wt %, or 80 wt %, or 90 wt %, based on the total weight of the crosslinkable composition.

The filler may comprise two or more embodiments disclosed herein.

(C) Reactive Branched Silicone-Containing Polymer

The crosslinkable composition includes a reactive branched silicone-containing polymer.

The reactive branched silicone-containing polymer has a specific gravity from 0.95, or 0.96, or 0.97 to 0.98, or 0.99, or 1.00, or 1.20, or 1.30, or 1.40 at 25° C.

The reactive branched silicone-containing polymer can be liquid or solid and room temperature (25° C.).

If a liquid at room temperature, the reactive branched silicone-containing polymer has a kinematic viscosity from 1 cSt, or 50 cSt, or 100 cSt, or 500 cSt, or 1,000 cSt, or 5,000 cSt, or 10,000 cSt to 15,000 cSt, or 25,000 cSt, or 50,000 cSt, or 75,000 cSt, or 1,000,000 cSt, or 5,000,000 cSt at 25° C.

The reactive branched silicone-containing polymer has a kinematic viscosity from 50 cSt, or 100 cSt, or 500 cSt, or 1,000 cSt, or 5,000 cSt, or 10,000 cSt to 15,000 cSt, or 25,000 cSt, or 50,000 cSt, or 75,000 cSt, or 1,000,000 cSt, or 5,000,000 cSt at 150° C.

In an embodiment, the reactive branched silicone-containing polymer is a polysiloxane. A branched polysiloxane is a polymer having the general structure (I):

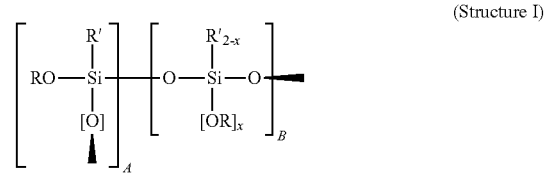

(Structure I)

where x is 0 or 1, each R is independently an alkyl group or aryl group, each R' is independently an alkyl group, an aryl group, an alkoxy group, or an aryloxy group, A is the molar ratio of crosslinked units and is greater than 0, B is the molar ratio of linear units and is greater than 0, and A+B is equal to 1.00. In Structure I above, each "wedge bond" or "▬▬▬▬▬" indicates a bond to a Si in another polysiloxane chain.

In an embodiment, the A:B ratio is from 1:99, or 5:95, or 25:75 to 95:5, or 97:3, or 99:1.

In an embodiment, the branched polysiloxane is a block polysiloxane having blocks of linear units and blocks of crosslinked units or a random polysiloxane having random equilibration distributions of the crosslinked units and linear units with a natural distribution of differing structures.

The branched silicone-containing polymer is reactive. A reactive silicone-containing polymer includes at least one terminal functional group, i.e., a functional group on an end of the polymer. Nonlimiting examples of suitable functional groups include groups which can go through both hydrolysis and condensation reactions, such as hydroxysiloxy groups, trimethoxysiloxy group, and alkyloxysiloxy group.

A reactive branched polysiloxane is a branched polysiloxane that contains at least one terminal functional group, i.e., a functional group on an end of the polymer.

In an embodiment, the reactive branched polysiloxane has an aryl group to alkyl group ratio from 0:0, or 0.05:1, or 0.1:1, or 0.2:1, or 03:1, or 0.4:1, or 0.5:1 to 0.6:1, or 0.7:1, or 0.8:1, or 0.9:1, or 1:1.

In an embodiment, the reactive branched polysiloxane contains only methyl and phenyl (functionalized or non-functionalized) groups. In an embodiment the ratio of phenyl branches to methyl branches is from 0.1:1, or 0.2:1, or 0.3:1, or 0.4:1, or 0.5:1 to 0.6:1, or 0.7:1, or 0.8:1, or 0.9:1, or 1:1.

In an embodiment, the reactive branched polysiloxane has a degree of substitution from 1.00, or 1.05, or 1.10, or 1.15, or 1.20 to 1.25, or 1.50, or 1.70, or 1.75, or 1.80, or 1.85, or 1.90, or 1.95, or 2.00.

In an embodiment, the reactive branched polysiloxane is a phenyl methyl silicone polymer fluid having unreacted methoxysilane end groups or a phenyl methyl silicone polymer flake resin having silanol end groups.

Non-limiting examples of suitable reactive branched polysiloxanes include Dow Corning 3037, a phenylmethyl silane polymer fluid (0.25:1 phenyl:methyl) having unreacted methoxysilane end groups with a total methoxy content off 15-18%, available from Dow Corning, and RSN-249, a phenyl methyl silicone polymer flake resin (0.6:1 phenyl:methyl) having silanol end groups with a total hydroxy content of 6%, available from Dow Corning.

In an embodiment, the reactive branched silicone-containing polymer is a blend of two or more reactive silicone-containing polymers as described herein.

In an embodiment, the reactive branched silicone-containing polymer or blend of two or more reactive branched silicone-containing polymers is present in an amount from greater than or equal to 1.0 wt, or 1.5 wt %, or 2.0 wt %, or 2.5 wt %, or 3 wt %, or 3.5 wt %, or 4 wt %, or 5 wt % to 8 wt %, or 10 wt %, or 12 wt %, or 15 wt %, or 18 wt %, or 20 wt %, or 30 wt %, or 40 wt %, or 50 wt % based on the total weight of the crosslinkable composition.

The reactive branched silicone-containing polymer may comprise two or more embodiments disclosed herein.

(D) Silanol Condensation Catalyst

In an embodiment, the crosslinkable composition includes silanol condensation catalyst, such as Lewis and Brønsted acids and bases. A "silanol condensation catalyst" promotes crosslinking of the silane-functionalized polyolefin. Lewis acids are chemical species that can accept an electron pair from a Lewis base. Lewis bases are chemical species that can donate an electron pair to a Lewis acid. Non-limiting examples of suitable Lewis acids include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. Non-limiting examples of suitable Lewis bases include the primary, secondary and tertiary amines. Silanol condensation catalysts are typically used in moisture cure applications.

The silanol condensation catalyst is added to the crosslinkable composition during the cable manufacturing process. As such, the silane-functionalized polyolefin may experience some crosslinking before it leaves the extruder with the completion of the crosslinking after it has left the extruder upon exposure to humidity present in the environment in which it is stored, transported or used, although a majority of the crosslinking is delayed until exposure of the final composition to moisture (e.g., a sauna bath or a cooling bath)

In an embodiment, the silanol condensation catalyst is included in a catalyst masterbatch blend, and the catalyst masterbatch is included in the composition. The catalyst masterbatch includes the silanol condensation catalyst in one or more carrier resins. In an embodiment, the carrier resin is the same as the polyolefin resin which is functionalized with silane to become the silane-functionalized polyolefin or another polymer which is not reactive in the present composition. In an embodiment, the carrier resin is a blend of two or more such resins. Non-limiting examples of suitable carrier resins include polyolefin homopolymers (e.g., polypropylene homopolymer, polyethylene homopolymer), propylene/alpha-olefin polymers, and ethylene/alpha-olefin polymers.

Non-limiting examples of suitable catalyst masterbatch include those sold under the trade name SI-LINK™ from The Dow Chemical Company, including SI-LINK™ DFDA-5481 Natural and SI-LINK™ AC DFDA-5488 NT. SI-LINK™ DFDA-5481 Natural is a catalyst masterbatch containing a blend of 1-butene/ethene polymer, ethene homopolymer, phenolic compound antioxidant, dibutyltin dilaurate (DBTDL) (a silanol condensation catalyst), and a phenolic hydrazide compound. SI-LINK™ AC DFDA-5488 NT is a catalyst masterbatch containing a blend of a thermoplastic polymer, a phenolic compound antioxidant, and a hydrophobic acid catalyst (a silanol condensation catalyst).

In an embodiment, the silanol condensation catalyst is a mixture of two or more silanol condensation catalysts as described herein.

In an embodiment, the silanol condensation catalyst is present in an amount from 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based on the total weight of the crosslinkable composition.

In an embodiment, the composition contains from 0.5 wt %, or 1.0 wt %, or 2.0 wt %, or 3.0 wt %, or 4.0 wt % to 5.0 wt %, or 6.0 wt %, or 7.0 wt %, or 8.0 wt %, or 9.0 wt %, or 10.0 wt %, or 15.0 wt %, or 20.0 wt % catalyst masterbatch, based on total weight of the crosslinkable composition.

The silanol condensation catalyst may comprise two or more embodiments disclosed herein.

(E) Optional Additives

In an embodiment, the crosslinkable composition includes one or more optional additives. Non-limiting examples of suitable additives include metal deactivators, moisture scavengers, antioxidants, anti-blocking agents, stabilizing agents, colorants, ultra-violet (UV) absorbers or stabilizers (e.g., hindered amine light stabilizers (HALS) and titanium dioxide), other flame retardants, compatibilizers, fillers and processing aids. Nonlimiting examples of UV stabilizers include hindered.

Metal deactivators suppress the catalytic action of metal surfaces and traces of metallic minerals. Metal deactivators convert the traces of metal and metal surfaces into an inactive form, e.g., by sequestering. Non-limiting examples of suitable metal deactivators include 1,2-bis(3,5-di-tert-butyl-4-hydroxyhydrocinnamoyl)hydrazine, 2,2'-oxamindo bis[ethyl 3-(3,5-di-tert-butyl-4-hydroxyphenyl)propionate], and oxalyl bis(benzylidenehydrazide) (OABH). In an embodiment, the crosslinkable composition includes OABH. The metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt % or 10 wt %, based on the total weight of the crosslinkable composition.

Moisture scavengers remove or deactivate unwanted water in the crosslinkable composition to prevent unwanted (premature) crosslinking and other water-initiated reactions in the crosslinkable composition. Non-limiting examples of moisture scavengers include organic compounds selected from ortho esters, acetals, ketals or silanes such as alkoxy silanes. In an embodiment, the moisture scavenger is an alkoxy silane. The moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the crosslinkable composition.

"Antioxidant" refers to types or classes of chemical compounds that are capable of being used to minimize the oxidation that can occur during the processing of polymers. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3 (3,5-di-tert-butyl-4-hydroxyphenyl)-propionate; n-octadecyl-3 (3,5-di-tert-butyl-4-hydroxyphenyl)-propionate; 4,4'-methylenebis(2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. In an embodiment, the composition includes pentaerythritol tetrakis(3-(3,5-di-tert-butyl-4-hydroxyphenyl) propionate), commercially available as Irganox® 1010 from BASF. The antioxidant is present in an amount can from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the crosslinkable composition.

Other optional additives, including anti-blocking agents, stabilizing agents, colorants, ultra-violet (UV) absorbers or stabilizers, other flame retardants, compatibilizers, fillers and processing aids, are present in an amount from 0 wt %, or greater than 0 wt %, or 0.01 wt %, or 0.1 wt % to 1 wt %, or 2 wt %, or 3 wt %, or 5 wt %, or 10 wt %, based on the total weight of the composition.

Crosslinkable Composition

In an embodiment, the insulation or jacket layer is a reaction product of a crosslinkable composition comprising (A) a silane-functionalized polyolefin, (B) optionally, a filler, (C) a reactive branched silicone-based polymer, and (D) a silanol condensation catalyst.

In an embodiment, the silane-functionalized polyolefin is present in an amount from 10 wt %, or 20 wt %, or 30 wt %, or 40 wt %, or 50 wt % to 60 wt %, or 80 wt %, or 90 wt %, or 95 wt %, based on the total weight of the crosslinkable composition.

In an embodiment, the filler is present in an amount from 0 wt %, or 10 wt %, or 20 wt %, or 40 wt % to 50 wt %, or 60 wt %, or 70 wt %, or 80 wt %, or 90 wt %, based on the total weight of the crosslinkable composition.

In an embodiment, the reactive branched silicone-containing polymer is present in an amount from greater than 1.0 wt, or 1.5 wt %, or 2.0 wt %, or 2.5 wt %, or 3 wt %, or 3.5 wt %, or 4 wt %, or 5 wt % to 8 wt %, or 10 wt %, or 12 wt %, or 15 wt %, or 18 wt %, or 20 wt %, based on the total weight of the crosslinkable composition.

In an embodiment, the silanol condensation catalyst is present in an amount from 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based on the total weight of the crosslinkable composition.

In an embodiment, a metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt % or 10 wt %, based on the total weight of the crosslinkable composition.

In an embodiment, a moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the crosslinkable composition.

In an embodiment, an antioxidant is present in an amount from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the crosslinkable composition.

In an embodiment, one or more additives, e.g., anti-blocking agents, stabilizing agents, colorants, UV-absorbers or stabilizers, other flame retardants, compatibilizers, fillers and processing aids, is present in an amount from 0 wt %, or greater than 0 wt %, or 0.01 wt %, or 0.1 wt % to 1 wt %, or 2 wt %, or 3 wt % based on the total weight of the crosslinkable composition.

The crosslinkable composition can be prepared by dry blending or melt blending the individual components and additives. The melt blend can be pelletized for future use or immediately transferred to an extruder to form an insulation or jacket layer and/or coated conductor. For convenience, certain ingredients may be premixed, such as by melt processing or into masterbatches.

In an embodiment, the crosslinkable composition is moisture-curable.

The crosslinkable composition can comprise two or more embodiments disclosed herein.

Insulation or Jacket Layer

In an embodiment, the crosslinkable composition is used to form a jacket layer. In an embodiment, the jacket layer is an insulation layer.

The process for producing an insulation or jacket layer includes heating the crosslinkable composition to at least the melting temperature of the silane-functionalized polyolefin and then extruding the polymer melt blend onto a conductor. The term "onto" includes direct contact or indirect contact between the melt blend and the conductor. The melt blend is in an extrudable state.

The insulation or jacket layer is crosslinked. In an embodiment, the crosslinking begins in the extruder, but only to a minimal extent. In another embodiment, crosslinking is delayed until the composition is cured by exposure to moisture ("moisture curing").

As used herein, "moisture curing" is the hydrolysis of hydrolysable groups by exposure of the silane-functionalized polyolefin to water, yielding silanol groups which then undergo condensation (with the help of the silanol condensation catalyst) to form silane linkages. The silane linkages couple, or otherwise crosslink, polymer chains to produce the silane-coupled polyolefin. A schematic representation of the moisture curing reaction is provided in reaction (V) below.

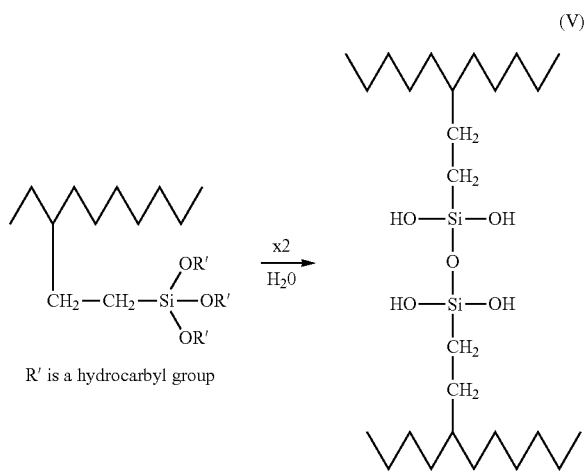

In an embodiment, the moisture is water. In an embodiment, the moisture curing is conducted by exposing the insulation or jacket layer or coated conductor to water in the form of humidity (e.g., water in the gaseous state or steam) or submerging the insulation or jacket layer or coated conductor in a water bath. Relative humidity can be as high as 100%.

In an embodiment, the moisture curing takes place at a temperature from room temperature, (ambient conditions) to up to 100° C. for a duration from 1 hour, or 4 hours, or 12 hours, or 24 hours, or 3 days, or 5 days to 6 days, or 8 days, or 10 days, or 12 days, or 14 days, or 28 days, or 60 days.

In an embodiment, the disclosure provides an insulation or jacket layer for a coated conductor comprising (A) a crosslinked silane-functionalized polyolefin, (B) a filler, (C) a reactive branched silicone-containing polymer, and (D) from 0.000 wt % to 20 wt % of a silanol condensation catalyst, based on the total weight of the insulation or jacket layer.

In an embodiment, the silane-functionalized polyolefin is present in an amount from 10 wt %, or 20 wt %, or 30 wt %, 40 wt %, or 50 wt % to 60 wt %, or 80 wt %, or 90 wt %, or 95 wt %, based on the total weight of the insulation or jacket layer.

In an embodiment, the filler is present in an amount from 0 wt %, or 10 wt %, or 20 wt %, or 40 wt % to 50 wt %, or 60 wt %, or 70 wt %, or 80 wt %, or 90 wt %, based on the total weight of the insulation or jacket layer.

In an embodiment, the reactive branched polysiloxane is present in an amount from greater than 1.0 wt, or 1.5 wt %, or 2.0 wt %, or 2.5 wt %, or 3 wt %, or 3.5 wt %, or 4 wt %, or 5 wt % to 8 wt %, or 10 wt %, or 12 wt %, or 15 wt %, or 18 wt %, or 20 wt %, based on the total weight of the insulation or jacket layer.

In an embodiment, the silanol condensation catalyst is present in an amount from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based on the total weight of the of the insulation or jacket layer.

In an embodiment, a metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt % or 10 wt %, based on the total weight of the insulation or jacket layer.

In an embodiment, a moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the insulation or jacket layer.

In an embodiment, an antioxidant is present in an amount from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the insulation or jacket layer.

In an embodiment, one or more additives, e.g., anti-blocking agents, stabilizing agents, colorants, UV-absorbers or stabilizers, other flame retardants, compatibilizers, fillers and processing aids, is present in an amount from 0 wt %, or greater than 0 wt %, or 0.01 wt %, or 0.1 wt % to 1 wt %, or 2 wt %, or 3 wt % based on the total weight of the insulation or jacket layer.

In an embodiment, the insulation or jacket layer has a thickness from 5 mil, or from 10 mil, or from 15 mil, or from 20 mil, to 25 mil, or 30 mil, or 35 mil, or 40 mil, or 50 mil, or 75 mil, or 100 mil.

In an embodiment, the insulation or jacket layer has a crush resistance of greater than 5000 Newtons, or 5300 Newtons, or 5700 Newtons, or 6000 Newtons, or 6200 Newtons.

In an embodiment, the insulation or jacket layer has a crush resistance from 5000 Newtons, or 5300 Newtons, or 5700 Newtons, or 6000 Newtons, or 6200 Newtons to 6500 Newtons, or 7000 Newtons, or 7200 Newtons, or 7500 Newtons, or 8000 Newtons, or 8500 Newtons.

In an embodiment, the insulation or jacket layer has a hot deformation (at 131° C. for 30 minutes) of less than 35%, or less than 30%, or less than 25%.

In an embodiment, the insulation or jacket layer has a hot deformation (at 131° C. for 30 minutes) from 0%, or greater than 0%, or 5%, or 10%, or 15% to 20%, or 25%, or 30%, or 35%.

In an embodiment, the insulation or jacket layer has a crush force at fail from 5000 Newtons, or 5300 Newtons, or 5500 Newtons, or 5700 Newtons, or 6000 Newtons, or 6200 Newtons to 6500 Newtons, or 7000 Newtons, or 7200 Newtons, or 7500 Newtons, or 8000 Newtons, or 8500 Newtons and a hot deformation (at 131° C. for 30 minutes) from 0%, or greater than 0%, or 5%, or 10%, or 15% to 20%, or 25%, or 30%, or 35%.

Insulation or Jacket Layer 1:

In an embodiment, the insulation or jacket layer comprises (A) from 35 wt %, or 38 wt %, or 40 wt % to 42 wt %, or 45 wt %, or 48 wt %, or 50 wt %, or 52 wt % based on the total weight of the insulation or jacket layer, of a silane-grafted polyethylene; (B) from 35 wt %, or 38 wt %, or 40 wt %, or 42 wt % to 45 wt %, or 48 wt %, or 50 wt %, or 52 wt %, based on the total weight of the insulation or jacket layer, of a filler; (C) from 1.0 wt %, or 3 wt %, or 5 wt % to 8 wt %, or 10 wt %, or 15 wt %, or 18 wt %, based on the total weight of the insulation or jacket layer, of a reactive branched polysiloxane; and (D) from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, based on the total weight of the insulation or jacket layer, of a silanol condensation catalyst.

Insulation or Layer 2:

In an embodiment, the insulation or jacket layer comprises (A) from 35 wt %, or 38 wt %, or 40 wt % to 42 wt %, or 45 wt %, or 48 wt %, or 50 wt %, or 52 wt %, based on the total weight of the insulation or jacket layer, of a silane-grafted polyethylene; (B) from 35 wt %, or 38 wt %, or 40 wt %, or 42 wt % to 45 wt %, or 48 wt %, or 50 wt %, or 52 wt %, based on the total weight of the insulation or jacket layer, of a filler; (C) 1.0 wt %, or 3 wt %, or 5 wt % to 8 wt %, or 10 wt %, or 15 wt %, or 18 wt %, based on the total weight of the insulation or jacket layer, of a reactive branched polysiloxane; and (D) from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, based on the total weight of the insulation or jacket layer, of a silanol condensation catalyst, wherein the reactive branched polysiloxane has a ratio of phenyl branches to methyl branches of 0.1:1, or 0.2:1, or 0.3:1, or 0.4:1, or 0.5:1 to 0.6:1, or 0.7:1, or 0.8:1, or 0.9:1, or 1:1.

In an embodiment, the insulation or jacket layer is according to Insulation or Jacket Layer 1 or Insulation or Jacket Layer 2 and has one or all of the following properties:
  (i) a crush resistance from 5000 Newtons, or 5300 Newtons, or 5500 Newtons, or 5700 Newtons, or 6000 Newtons, or 6200 Newtons to 6500 Newtons, or 7000 Newtons, or 7200 Newtons, or 7500 Newtons, or 8000 Newtons, or 8500 Newtons; and
  (ii) a hot deformation (at 131° C. for 30 minutes) from 5%, or 10%, or 15% to 20%, or 25%, or 30%, or 35%.

It was surprisingly discovered that the insulation or jacket layer comprising (A) a crosslinked silane-functionalized polyolefin, (B) a filler, and (C) a reactive branched silicone-containing polymer had improved crush resistance and hot deformation resistance compared to compositions without a reactive branched silicone-containing polymer. Not to be bound by any particular theory, it is believed that the functionality on the reactive branched silicone-containing polymer reacts with the alkoxysilane moiety on the silane-functionalized polyolefin during the moisture cure process, thus participating in the crosslinked network. Silicone-containing polymers without functionality do not participate in the crosslinked network.

Again, to not be bound by any particular theory, it is believed that linear reactive silicone-containing polymers do not show improvement in crush resistance and hot deformation resistance because (1) linear silicone-containing polymers are inherently less compatible with the silane-functionalized polyolefin matrix, and (2) if a bond of a linear silicone-containing polymer is broken, any crosslinking by the linear silicone-containing polymer is disrupted, whereas in a branched silicone-containing polymer, a minimum of three bonds must be broken to disrupt crosslinking.

The insulation or jacket layer may comprise two or more embodiments disclosed herein.

Coated Conductor

In an embodiment, the disclosure provides a coated conductor comprising a coating on the conductor, the coating comprising (A) a crosslinked silane-functionalized polyolefin, (B) a filler, (C) a reactive branched silicone-containing polymer, and (D) from 0.00 wt % to 20 wt %, based on the total weight of the coating, of a silanol condensation catalyst.

The process for producing the coated conductor includes heating the crosslinkable composition to at least the melting temperature of the silane-functionalized polyolefin and then extruding the polymer melt onto the conductor. The term "onto" includes direct contact or indirect contact between the melt blend and the conductor. The melt blend is in an extrudable state.

The coating is crosslinked. In an embodiment, the crosslinking begins in the extruder, but only to a minimal extent. In another embodiment, crosslinking is delayed until the composition is cured by exposure to moisture ("moisture curing").

In an embodiment, the moisture is water. In an embodiment, the moisture curing is conducted by exposing the coated conductor to water in the form of humidity (e.g., water in the gaseous state) or submerging the insulation or jacket layer or coated conductor in a water bath. Relative humidity can be as high as 100%.

In an embodiment, the moisture curing takes place at a temperature from room temperature (ambient conditions) up to 100° C. for a duration from 1 hour, or 4 hours, or 12 hours, or 24 hours, or 2 days, or 3 days, or 5 days to 6 days, or 8 day, or 10 days, or 12 days, or 14 days, or 28 days, or 60 days.

In an embodiment, the silane-functionalized polyolefin is present in an amount from 10 wt %, or 20 wt %, or 30 wt %, or 40 wt %, or 50 wt % to 60 wt %, or 80 wt %, or 90 wt %, or 95 wt %, based on the total weight of the coating.

In an embodiment, the filler is present in an amount from 0 wt %, or 10 wt %, or 20 wt %, or 40 wt % to 50 wt %, or 60 wt %, or 70 wt %, or 80 wt %, or 90 wt %, based on the total weight of the crosslinkable composition.

In an embodiment, the reactive branched silicone-containing polymer is present in an amount from greater than 1.0 wt, or 1.5 wt %, or 2.0 wt %, or 2.5 wt %, or 3 wt %, or 3.5 wt %, or 4 wt %, or 5 wt % to 8 wt %, or 10 wt %, or 12 wt %, or 15 wt %, or 18 wt %, or 20 wt %, based on the total weight of the coating.

In an embodiment, the silanol condensation catalyst is present in an amount from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based on the total weight of the coating.

In an embodiment, a metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt % or 10 wt %, based on the total weight of the coating.

In an embodiment, a moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the coating.

In an embodiment, an antioxidant is present in an amount from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the coating.

In an embodiment, one or more additives, e.g., anti-blocking agents, stabilizing agents, colorants, UV-absorbers or stabilizers, other flame retardants, compatibilizers, fillers and processing aids, is present in an amount from 0 wt %, or greater than 0 wt %, or 0.01 wt %, or 0.1 wt % to 1 wt %, or 2 wt %, or 3 wt % based on the total weight of the coating.

The coating may be one or more inner layers. The coating may wholly or partially cover or otherwise surround or encase the conductor. The coating may be the sole component surrounding the conductor. Alternatively, the coating may be one layer of a multilayer jacket or sheath encasing the conductor. In an embodiment, the coating directly contacts the conductor. In another embodiment, the coating directly contacts an intermediate layer surrounding the conductor.

In an embodiment, the coating has a thickness from 5 mil, or from 10 mil, or from 15 mil, or from 20 mil, to 25 mil, or 30 mil, or 35 mil, or 40 mil, or 50 mil, or 75 mil, or 100 mil.

In an embodiment, the coated conductor has a crush resistance of greater than 5000 Newtons, or 5300 Newtons, or 5700 Newtons, or 6000 Newtons, or 6200 Newtons.

In an embodiment, the coated conductor has a crush resistance from 5000 Newtons, or 5300 Newtons, or 5700 Newtons, or 6000 Newtons, or 6200 Newtons to 6500 Newtons, or 7000 Newtons, or 7200 Newtons, or 7500 Newtons, or 8000 Newtons, or 8500 Newtons.

In an embodiment, the coated conductor has a hot deformation (at 131° C. for 30 minutes) of less than 35%, or less than 30%, or less than 25%.

In an embodiment, the coated conductor has a hot deformation (at 131° C. for 30 minutes) from 0%, or greater than 0%, or 5%, or 10%, or 15% to 20%, or 25%, or 30%, or 35%.

In an embodiment, the coated conductor has a crush resistance from 5000 Newtons, or 5300 Newtons, or 5700 Newtons, or 6000 Newtons, or 6200 Newtons to 6500 Newtons, or 7000 Newtons, or 7200 Newtons, or 7500 Newtons, or 8000 Newtons, or 8500 Newtons and a hot deformation (at 131° C. for 30 minutes) from 0%, or greater than 0%, or 5%, or 10%, or 15% to 20%, or 25%, or 30%, or 35%.

In an embodiment, the coating on the coated conductor is according to Insulation or Jacket Layer 1 or Insulation or Jacket Layer 2 and the coated conductor has one or all of the following properties:
  (i) a crush resistance from 5000 Newtons, or 5300 Newtons, or 5500 Newtons, or 5700 Newtons, or 6000 Newtons, or 6200 Newtons to 6500 Newtons, or 7000 Newtons, or 7200 Newtons, or 7500 Newtons, or 8000 Newtons, or 8500 Newtons; and
  (ii) a hot deformation (at 131° C. for 30 minutes) from 5%, or 10%, or 15% to 20%, or 25%, or 30%, or 35%.

In an embodiment, the coating is a jacket layer. In an embodiment, the jacket layer is an insulation layer.

The coated conductor may comprise two or more embodiments disclosed herein.

Some embodiments of the present disclosure will now be described in detail in the following examples.

EXAMPLES

Materials

ENGAGE 8402 is an ethylene-octene copolymer with a density of 0.902 g/cc and a MI of 30 g/10 min.

VTMS is a vinyltrimethoxysilane having a density of 0.968 g/mL at 25° C. and a boiling point of 123° C.

Luperox 101 is 2,5-bis(tert-butylperoxy)-2,5-dimethylhexane, a grafting initiator.

Min-U-Sil 5 is crystalline silica filler with a D90 of 5 micron and a purity of 99.4%.

HR50 is amorphous silica filler.

UFT is surface treated calcium carbonate filler.

Irganox 1010 is an antioxidant.

Dow Corning 3037 is a reactive branched polysiloxane (phenyl methyl silicone polymer fluid) with unreacted terminal methoxysilane groups, a phenyl:methyl branch ratio of 0.25:1, a methoxy content of 15-18%, a molecular weight of 700-1500 Daltons, a specific gravity at 25° C. of 1.07, a kinematic viscosity at 25° C. of 8-20 cSt and a degree of substitution of 1.7.

RSN-249 is a reactive branched polysiloxane (phenyl methyl silicone polymer flake resin) with terminal silanol groups, a phenyl:methyl branch ratio of 0.6:1, a hydroxyl content of 6%, a specific gravity at 25° C. of 1.30, a kinematic viscosity at 150° C. of 235 cSt, and a degree of substitution 1.15.

XIAMETER® PMX-200 (60k cSt) is a nonreactive linear polydimethylsiloxane with a specific gravity at 25° C. of 0.977, a kinematic viscosity at 25° C. of 60,000 cSt, and a degree of substitution of 2.

XIAMETER® PMX-200 (1M cSt) is a non-reactive linear polydimethylsiloxane (dimethyl siloxane, trimethylsiloxy-terminated) with a specific gravity at 25° C. of 0.978, a kinematic viscosity at room temperature of $1e^{+006}$ cSt, and a degree of substitution of 2.

XIAMETER® OHX-4000 is a reactive linear polydimethylsiloxane with terminal silanol groups (dimethyl siloxane, hydroxy-terminated) with a specific gravity at 25° C. of 0.972, a dynamic viscosity of 2,000 cSt, and a degree of substitution of 2.

Ti-Pure R-105 is a titanium dioxide filler.

Oxalyl bis (benzylidene) hydroxide is a metal deactivator.

Moisture Scavenger 1 is hexadecyltrimethoxysilane.

Moisture Scavenger 2 is Prosil 9202.

ENGAGE 8450 is an ethylene/octene copolymer with a density of 0.902 g/cc and a MI of 3.0 g/10 min.

DFH-2065 is a linear low density polyethylene having a melt index of 0.65 grams/10 minutes and a density of 0.920 g/cc, available from The Dow Chemical Company.

DFDA-1216 is a low-density polyethylene with a density of 0.92 g/cc and a MI of 2.35 g/10 min.

The silanol condensation catalyst is dibutyltin dilaurate.

1,2-bis(3,5-di-tert-butyl-4-hydroxyhydrocinnamoyl)hydrazine is an antioxidant.

Tetrakis(methylene(3,5-di-tert-butyl-4-hydroxyhydrocinnamate))methane is a stabilizer.

Sample Preparation

A silane-grafted polyethylene is prepared by reactive extrusion through a twin-screw extruder. 1.8 wt %, based on the total weight of base resin (ENGAGE 8402), of vinyltrimethoxysilane (VTMS) and 900 ppm based on the total weight of base resin (ENGAGE 8402) of Luperox 101 are weighed and mixed together followed by approximately 10 to 15 minutes of magnetic stirring to achieve a uniform liquid mixture. The mixture is placed on a scale and connected to a liquid pump injection. ENGAGE 8402 is fed into the main feeder of the ZSK-30 extruder. The barrel temperature profile of the ZSK-30 is set as follows:

2-3 160° C.
4-5 195° C.
6-7 225° C.
8-9 225° C.
10-11 170° C.

with a pellet water temperature as near to 10° C. (50° F.) as possible and a chiller water temperature as near to 4° C. (40° C.) as possible.

The amount of VTMS grafted to the polyethylene is determined by infrared spectroscopy. Spectra are measured with a Nicolet 6700 FTIR instrument. The absolute value is measured by FTIR mode without the interference from surface contamination. The ratio of the absorbances at 1192 $cm^{-1}$ and 2019 $cm^{-1}$ (internal thicknesses) is determined. The ratio of the 1192/2019 peak heights is compared to standards with known levels of VTMS in DFDA-5451 (available as SI-LINK 5451 from the Dow Chemical Company). Results show that the grafted VTMS content of the silane-grafted polyethylene (Si-g-PE) is about 1.7 mass % based on the total mass of the polymer.

The Si-g-PE is added into a Brabender at melt temperature (around 140° C.) and the inorganic filler, silicone-containing polymer, and other optional additives (e.g., metal deactivator, moisture scavenger, etc.) are added into the bowl after the Si-g-PE is melted in amounts as specified in Tables 2 and 3, below. The mixture is mixed for about 5 minutes.

The mixture is then pelletized into small pieces for wire extrusion. In the extrusion step, the silanol condensation catalyst, in the form of a masterbatch as set forth in Table 2, below, is added with the pelletized mixture to extrude the wire on copper wire of 0.064 in diameter. The wall thickness is set around 30 mil and the extrusion temperature is from 140° C. to a head temperature of 165° C. The concentration of silanol condensation catalyst in the overall composition is in the range of 0.01 wt % to 0.5 wt %.

The extruded wires are cured in a 90° C. water bath overnight. The crush resistance and hot deformation tests follow the standard Section 7.11, UL-2556 (crush) and Section 7.8, UL-2556 (hot deformation), respectively.

Crush resistance is measured according to UL 2556 Section 7.11 using a power driven compression machine capable of measuring the compression force at rupture to an accuracy of 2%. The device operates at a power-actuated jaw speed of 10+/−1 mm/min (0.5+/−0.05 inches/min), employing two flat steel plates 50 mm (2 in) wide and a 30 Volts DC power with a means of indicating contact between the wire conductor and the steel plate. A 2500 mm (100 in) sample, with one end of the conductor made bare and connected to one side of the power plate, is placed between the horizontally mounted steel plates in the compression machine. The first test point on the specimen is centered on the lower plate and parallel to the 50 mm (2 in) dimension. The upper steel plate is lowered until contact is made with the surface of the specimen. The downward motion of the plate is continued at the specified rate until the indicator signals contact. The force indicated by the compression machine at the moment of contact is then recorded. The procedure is repeated at nine additional test points at least 250 mm (10 in) apart and at least 125 mm (5 in) from either end of the specimen. The average of ten specimens is calculated.

Hot deformation measures the resistance to deformation of the wire insulation at elevated temperatures and is measured according to UL 2556 Section 7.8. A forced-circulation air oven with an accuracy of +/−1° C. is set to 131° C. The wire specimens are nominal 25 mm (1 in) in length and the diameter of the bare conductor is measured using a dial micrometer in accordance with Clause 3.1 on an adjacent section of the conductor, taken not more than 150 mm (6 in) from the end of the specimen. The test specimen is marked at the position where the foot of the 500 g weight is to bear on the specimen. The initial thickness of the smoothed specimen is measured using a dial micrometer to an accuracy of 0.001 mm (0.0001 in). Keeping the apparatus at target temperature for one hour, at the end of this time, while still in the oven, the specimen is placed under the foot of the weight at the marked position. The specimen remains under test conditions for 30 minutes. At the end of this time, the thickness at the marked position is measured. Evidence of splitting, cracking through and exposed conductor are noted.

The percent deformation is calculated with the equation: deformation %=$(T_1-T_2)T_1 \times 100$, wherein $T_1$ is the thickness before the test (mm) and $T_2$ is the thickness after the test (mm).

TABLE 1

| Catalyst Masterbatch | |
|---|---|
| ENGAGE 8450 | 80.00 wt % |
| DFH-2065 LLDPE | 17.14 wt % |
| DFDA-1216 NT LDPE | 1.34 wt % |
| 1,2-bis(3,5-di-tert-butyl-4-hydroxyhydrocinnamoyl)hydrazine | 0.33 wt % |
| Tetrakis(methylene(3,5-di-tert-butyl-4-hydroxyhydrocinnamate))methane | 0.67 wt % |
| Dibutyltin dilaurate | 0.52 wt % |
| Total: | 100.00 wt % |

TABLE 2

Comparative and Inventive Formulations

| | Component (wt %) | CS1 | CS2 | CS3 | CS4 | CS5 | CS6 | IE1 | IE2 | IE3 | IE4 | IE5 | IE6 | IE7 |
|---|---|---|---|---|---|---|---|---|---|---|---|---|---|---|
| Inorganic Filler | Si-g-PE | 43.57 | 47.69 | 47.69 | 49.74 | 44.59 | 4.59 | 49.76 | 49.76 | 48.71 | 44.59 | 44.59 | 39.43 | 34.28 |
| | Min-U-Sil 5 (silica) | 49.48 | 45.69 | 45.37 | | | | 43.57 | | | | | | |
| | HR50 (silica) | | | | | | | | 43.57 | | | | | |
| | Titanium Dioxide | 1.03 | 1.03 | 1.03 | | | | 0.99 | 0.99 | | | | | |
| | UFT (CaCO3) | | | | 49.49 | 49.49 | 49.49 | | | | 49.49 | 49.49 | 49.49 | 49.49 |
| Silicone-Containing Polymer | Dow Corning 3037 | | | | | | | 4.95 | 4.95 | 1.03 | 5.15 | 5.15 | | |
| | RSN-0249 | | | | | | | | | | | | 10.31 | 15.46 |
| | PMX-200 (60K cts) | 5.15 | 5.14 | | | | | | | | | | | |
| | PMX-200 (1M cts) | | | | | | 5.15 | | | | | | | |
| | OHX-4000 | | | 5.14 | | | 5.15 | | | | | | | |
| | Metal deactivator | 0.04 | 0.04 | 0.04 | 0.04 | 0.04 | 0.04 | 0.04 | 0.04 | 0.04 | 0.04 | 0.04 | 0.04 | 0.04 |
| | Irganox 1010 | 0.21 | 0.21 | 0.21 | 0.21 | 0.21 | 0.21 | 0.20 | 0.20 | 0.21 | 0.21 | 0.21 | 0.21 | 0.21 |
| | Moisture Scavenger 1 | 0.52 | 0.52 | 0.52 | | | | 0.49 | 0.49 | | | | | |
| | Moisture Scavenger 2 | | | | 0.52 | 0.52 | 0.52 | | | 0.52 | 0.52 | 0.52 | 0.52 | 0.52 |
| Total Before Extrusion | | 100.00 | 100.00 | 100.00 | 100.00 | 100.00 | 100.00 | 100.00 | 100.00 | 100.00 | 100.00 | 100.00 | 100.00 | 100.00 |
| | Catalyst Masterbatch (Table 1) | +3.00 | +3.00 | +3.00 | +3.00 | +3.00 | +3.00 | +3.00 | +3.00 | +3.00 | +3.00 | +3.00 | +3.00 | +3.00 |
| Total | | 103.00 | 103.00 | 103.00 | 103.00 | 103.00 | 103.00 | 103.00 | 103.00 | 103.00 | 103.00 | 103.00 | 103.00 | 103.00 |

CE = comparative sample
IE = inventive example

TABLE 3

Properties of Comparative Samples and Inventive Examples

| | Filler Type | Filler % | Silicone-Containing Polymer | Silicone-Containing Polymer % | Degree of Substitution | Aryl Group to Alkyl Group Ratio | Crush Resistance (Newtons) | Hot Deformation (%) |
|---|---|---|---|---|---|---|---|---|
| | Silica Examples | | | | | | | |
| IE1 | Min-U-Sil 5 | 43.57 | Dow Corning 3037 | 4.95 | 1.7 | 0.25:1 | ≥7117.2 | 15 |
| IE2 | HR50 | 43.57 | Dow Corning 3037 | 4.95 | 1.7 | 0.25:1 | 5858.3 | 22 |
| CS1 | Min-U-Sil 5 | 49.48 | PMX-200 (60k cSt) | 5.15 | 2 | 0 | 4386.0 | 27 |
| CS2 | Min-U-Sil 5 | 45.69 | PMX-200 (60k cSt) | 5.14 | 2 | 0 | 3972.3 | 31 |
| CS3 | Min-U-Sil 5 | 45.37 | OHX 4000 | 5.14 | 2 | 0 | 3914.4 | 37 |
| | CaCO3 Examples | | | | | | | |
| IE4 | UFT | 49.49 | Dow Corning 3037 | 5.15 | 1.7 | 0.25:1 | ≥8006.8 | 29 |
| IE5 | UFT | 49.49 | Dow Corning 249 | 5.15 | 1.15 | 0.6:1 | ≥8006.8 | 26 |
| CS4 | UFT | 49.49 | None | 0.00 | N/A | N/A | 6783.5* | 34 |
| CS5 | UFT | 49.49 | PMX-200 (1M cSt) | 5.15 | 2 | 0.25:1 | 4314.8 | 36 |
| CS6 | UFT | 49.49 | OHX-4000 | 5.15 | 2 | 0.25:1 | 3523.0 | 42 |
| | Silicone-Containing Polymer Range | | | | | | | |
| IE3 | UFT | 49.49 | Dow Corning 3037 | 1.03 | 1.7 | 0.25:1 | ≥6859.2* | 32.5 |
| IE4 | UFT | 49.49 | Dow Corning 3037 | 5.15 | 1.7 | 0.25:1 | ≥8006.8 | 29 |
| IE5 | UFT | 49.49 | Dow Corning 249 | 5.15 | 1.15 | 0.6:1 | ≥8006.8 | 26 |
| IE6 | UFT | 49.49 | Dow Corning 249 | 10.31 | 1.15 | 0.6:1 | ≥7037.1* | 27.5 |
| IE7 | UFT | 49.49 | Dow Corning 249 | 15.46 | 1.15 | 0.6:1 | ≥8006.8 | 22 |

CE = comparative sample
IE = inventive example
*specimens yield a crush value over 8006.8 Newtons (the measurement limit) and 8006.8 Newtons is used to calculate the average Inventive Examples 1-7 show that using a reactive branched polysiloxane in the insulation or jacket layer results in high crush resistance (e.g., above 5000 Newtons). Particularly, a comparison of IE1-2 and IE 4-5 to CS1-3 and CS4-6, respectively, shows that the improvement in crush resistance and hot deformation is seen regardless of the type of inorganic filler. Each comparative sample (CS1-CS6) has a crush resistance of less than 5000 Newtons while each inventive example (IE1-IE7) has a crush resistance of 5858.3 Newtons or greater.

With respect to hot deformation, a comparison of IE1-IE2 to CS1-CS3 and IE4-IE5 to CS4-CS6 shows that, for a given filler, the inventive formulations containing a reactive branched polysiloxane have a lower hot deformation. Specifically, IE1-IE2 and CS1-CS3 each include a silica filler. However, IE1 and IE2, which also include a reactive branched polysiloxane, have hot deformation values of 15% and 22%, respectively, while CS1-CS3 (which do not include a reactive branched polysiloxane) have hot deformation values of 27%, 31% and 37%, respectively. Similarly, IE4-IE5 and CS4-CS6 each include a calcium carbonate filler. However, IE4 and IE5, which also include a reactive branched polysiloxane, have hot deformation values of 29% and 26%, respectively, while CS4-CS6 (which do not include a reactive branched polysiloxane) have hot deformation values of 34%, 36% and 42%, respectively.

Inventive Examples 3-6 also show that increasing the amount of reactive branched polysiloxane decreases the hot deformation.

Moreover, as reflected in Table 3, the inventive compositions containing a reactive branched polysiloxane have an unexpected balance of high crush resistance (e.g., above 5000 Newtons) and a low hot deformation (e.g., less than 35%).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A jacket layer for a coated conductor, the jacket layer comprising:
   (A) from 20 wt % to 80 wt % of a crosslinked silane-functionalized polyolefin, wherein silane-functionalized polyolefin is a silane-grafted polyethylene;
   (B) from 20 wt % to 80 wt % of a filler;
   (C) from 1 wt % to 20 wt % of a reactive branched polysiloxane having the structure $$\left[ \begin{array}{c} R' \\ | \\ RO-Si- \\ | \\ [O] \\ \blacktriangle \end{array} \right]_A \left[ \begin{array}{c} R'_{2-x} \\ | \\ -O-Si-O- \\ | \\ [OR]_x \end{array} \right]_B$$

wherein x is 0 or 1, each R is independently an alkyl group or aryl group, each R' is independently an alkyl group, an aryl group, an alkoxy group, or an aryloxy group, A is the molar ratio of crosslinked units and is greater than 0, B is the molar ratio of linear units and is greater than 0, A+B is equal to 1.00, and "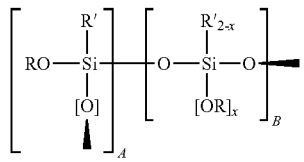" is a bond to a Si in another polysiloxane chain; and (D) from 0.00 wt % to 20 wt % of a silanol condensation catalyst, based on the total weight of the jacket layer.

2. The jacket layer of claim 1, wherein the reactive branched polysiloxane has a ratio of phenyl branches to methyl branches from 0.1:1 to 1:1.

3. The jacket layer of claim 1, wherein the reactive branched polysiloxane comprises a functional group selected from the group consisting of a silanol group and an alkoxysilane group.

4. The jacket layer of claim 1 having a crush resistance of 5000 Newtons to 8500 Newtons.

5. The jacket layer of claim 4 having a hot deformation from 0% to 35%.

6. The jacket layer of claim 1 wherein the jacket layer further comprises at least one of a metal deactivator, a moisture scavenger, and an antioxidant.

7. The jacket layer of claim 1, wherein the jacket layer is an insulation layer.

8. A coated conductor comprising:
   a conductor; and
   a coating on the conductor, the coating comprising
      (A) from 20 wt % to 80 wt % of a crosslinked silane-functionalized polyolefin, wherein the crosslinked silane-functionalized polyolefin is a crosslinked silane-grafted polyethylene;
      (B) from 20 wt % to 80 wt % of a filler;
      (C) from 1 wt % to 20 wt % of a reactive branched polysiloxane having the structure $$\left[ \begin{array}{c} R' \\ | \\ RO-Si- \\ | \\ [O] \\ \blacktriangle \end{array} \right]_A \left[ \begin{array}{c} R'_{2-x} \\ | \\ -O-Si-O- \\ | \\ [OR]_x \end{array} \right]_B$$

wherein x is 0 or 1, each R is independently an alkyl group or aryl group, each R' is independently an alkyl group, an aryl group, an alkoxy group, or an aryloxy group, A is the molar ratio of crosslinked units and is greater than 0, B is the molar ratio of linear units and is greater than 0, A+B is equal to 1.00, and "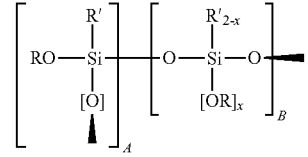" is a bond to a Si in another polysiloxane chain; and
      (D) from 0.00 wt % to 20 wt % of a silanol condensation catalyst, based on the total weight of the coating.

9. The coated conductor of claim 8, wherein the reactive branched polysiloxane has a ratio of phenyl branches to methyl branches from 0.1:1 to 1:1.

10. The coated conductor of claim 8, wherein the coating further comprises at least one of a metal deactivator, a moisture scavenger, and an antioxidant.

11. The coated conductor of claim 8 having a crush resistance of 5000 Newtons to 8500 Newtons.

12. The coated conductor of claim 11 having a hot deformation from 0% to 35%.

13. A crosslinkable composition comprising:
   (A) from 20 wt % to 80 wt % of a crosslinked silane-grafted polyethylene;
   (B) from 20 wt % to 80 wt % of a filler;
   (C) from 1 wt % to 20 wt % of a reactive branched polysiloxane having the structure

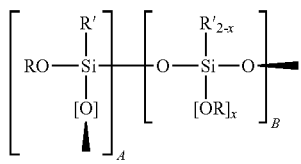

wherein x is 0 or 1, each R is independently an alkyl group or aryl group, each R' is independently an alkyl group, an aryl group, an alkoxy group, or an aryloxy group, A is the molar ratio of crosslinked units and is greater than 0, B is the molar ratio of linear units and is greater than 0, A+B is equal to 1.00, and "" is a bond to a Si in another polysiloxane chain; and (D) from 0.00 wt % to 20 wt % of a silanol condensation catalyst, based on the total weight of the composition.

14. The crosslinkable composition of claim 13, comprising the silanol condensation catalyst.

15. The crosslinkable composition of claim 14, comprising
(E) from 0.01 wt % to 10 wt % of a metal deactivator;
(F) from 0.01 wt % to 3.0 wt % of a moisture scavenger;
(G) from 0.01 wt % to 2 wt % of an antioxidant.

* * * * *